(12) United States Patent
Otsuki et al.

(10) Patent No.: US 7,292,399 B2
(45) Date of Patent: Nov. 6, 2007

(54) METHOD FOR FABRICATING METAL RING-FITTED OPTICAL DEVICE, AND METAL RING-FITTED OPTICAL DEVICE

(75) Inventors: Motohiko Otsuki, Miyagi-ken (JP); Kimihiro Kikuchi, Miyagi-ken (JP)

(73) Assignee: Alps Electric Co., Ltd., Toyko (JP)

( * ) Notice: Subject to any disclaimer, the term of this patent is extended or adjusted under 35 U.S.C. 154(b) by 525 days.

(21) Appl. No.: 10/341,208

(22) Filed: Jan. 13, 2003

(65) Prior Publication Data
US 2003/0131630 A1 Jul. 17, 2003

(30) Foreign Application Priority Data
Jan. 15, 2002 (JP) .............................. 2002-006081

(51) Int. Cl.
*G02B 7/02* (2006.01)
(52) U.S. Cl. .................... 359/811; 359/819; 359/830; 359/808
(58) Field of Classification Search ................ 359/808, 359/811, 818, 819, 830; 65/37, 39
See application file for complete search history.

(56) References Cited
U.S. PATENT DOCUMENTS 2,107,648 A  *  2/1938  Putterman .................... 362/317
3,582,300 A  *  6/1971  Coombes et al. ............... 65/31
4,302,076 A     11/1981 Hashimoto
4,506,959 A  *  3/1985  Hama ........................ 359/706
4,895,585 A     1/1990  Angenent et al.
5,593,438 A  *  1/1997  Akhavi et al. .............. 623/6.16
5,757,559 A  *  5/1998  Nomura et al. ............. 359/819

FOREIGN PATENT DOCUMENTS

JP    406214143 A  *  8/1994  .................. 359/811
JP    10 104 489        4/1998
JP    10 288 727       10/1998

* cited by examiner

Primary Examiner—Hung X. Dang
Assistant Examiner—Joseph Martinez
(74) Attorney, Agent, or Firm—Brinks Hofer Gilson & Lione

(57) ABSTRACT

A lens is fitted into a metal ring that covers the outer peripheral surface of the lens and can be soldered to a fixture member. The side cylindrical part of the metal ring is expanded toward the outer peripheral direction thereof by the pressure of the optical material put inside it, and, thus expanded, it defines the final dimension of the metal ring. One of the two openings formed on both sides of the side cylindrical part of the metal ring is so designed as to have a curving cylindrical part that extends from the side cylindrical part, and this curving cylindrical part is folded toward the optical functional face of the optical device to construct a metal ring-fitted optical device.

6 Claims, 4 Drawing Sheets

METHOD FOR FABRICATING METAL RING-FITTED OPTICAL DEVICE, AND METAL RING-FITTED OPTICAL DEVICE

BACKGROUND OF THE INVENTION

1. Field of the Invention

The present invention relates to a method for fabricating a metal ring-fitted optical device, and to the metal ring-fitted optical device. In particular, the invention relates to a method for fabricating a metal ring-fitted optical device, which is applicable to fabrication of an optical device having an optical functional face formed on its both surfaces and having, around its side face, an outer peripheral side part for positioning the device relative to the fixture to which the device is fitted; and relates to the metal ring-fitted optical device.

2. Description of the Related Art

One example of conventional optical devices is shown in FIG. 7 and FIG. 8, in which a small-diameter aspherical lens 70 made of optical glass and having a diameter of, for example, 1 mm or so is fitted to a V-grooved fixture (V-GROOVE) 60. As illustrated, the lens 70 is fitted into the V-groove 64 of the carrier 62 mounted on the stand 61 on which the lens 70 faces the laser diode 63 also mounted on the stand 61. In this structure, it is easy to make the optical axis OD of the laser diode 63 correspond to the optical axis OL of the lens merely by fitting the lens 70 into the V-groove 64 in the carrier 62 provided that the dimensional accuracy of the lens 70 relative to its outer peripheral face 71 is ensured. In that condition, this structure does not require any optical axis alignment control.

In the lens-fitting structure of the illustrated case, the lens 70 is fixed to the carrier 62 with the V-groove 64 formed therein, via an adhesive applied between them. However, using the adhesive 80 for fixing the lens 70 is problematic in that handling the adhesive 80 is troublesome and the component that evaporates from the adhesive 80 may deteriorate the atmosphere around the lens. Accordingly, it is desired to fit the lens to the carrier with solder, not using such an adhesive.

For soldering the lens in the manner as above, the peripheral part of the lens must be previously metallized. For metallizing such small-sized lenses, metal sputtering around lenses may be taken into consideration. However, since the lenses are small-sized, it is difficult to accurately handle them for metallization. In addition, the optical functional faces of the lenses must be protected so as not to be metallized. For these reasons, it has heretofore been impossible to efficiently produce the desired lenses.

To solve the problems, a method has been proposed of forming a solderable, thin-walled metal ring around the peripheral side face of a lens.

The lens of the type is so designed that a glass lens is fitted into a solderable, thin-walled metal ring, and this is therefore solderable. In addition, since its sidewall is covered with a metal ring, the glass lens inside the metal ring is damaged little as compared with nude glass lenses. Moreover, the glass lens fitted in such a thin-walled metal ring is better than a glass lens fitted in a thick-walled lens barrel, since the effective diameter of the metal ring-fitted lens could be almost the same as the outer diameter of the non-protected nude glass lens alone. The metal ring-fitted lens of the type may be fabricated, for example, as follows:

Briefly, a cylindrical mold to define the outer shape of the glass lens to be formed is set in an electromagnetic induction furnace, while the upper and lower pressing molds to be fitted into the cylindrical mold to thereby form the light-entering face and the light-emitting face of the glass lens are in the furnace above and below the cylindrical mold, and a lens material is put into the cavity surrounded by the molds. In that condition, the pressing molds are pressed toward the cylindrical mold to thereby form the intended optical faces of the glass lens while, at the same time, a metal ring is fitted to the side periphery of the lens being molded in that manner.

In this embodiment, a metal ring of which the outer diameter is somewhat smaller than the inner diameter of the cylindrical mold is disposed inside the cylindrical mold, and an optical glass pellet, a type of optical material is put inside the metal ring. With that, the cylindrical mold is heated with the induction current from the coil disposed outside the cylindrical mold so as to soften the glass pellet inside the metal ring at a predetermined temperature, and thereafter the thus-softened glass pellet in the metal ring is pressed by the upper and lower pressing molds to thereby form the lens face of a desired shape, while, at the same time, the metal ring is pressed and expanded by the pressure applied to the glass material toward the cylindrical mold disposed around the metal ring, and then this is cooled. Through the process, a metal ring-fitted lens having a predetermined outer shape is fabricated.

According to the lens fabrication method as above, when the glass material in the metal ring is compressed by the molds that surround it, the metal ring around the glass material expands outside owing to the inner pressure applied thereto and, as a result, it is pressed against the inside wall of the cylindrical mold disposed outside it and the glass material is then solidified as such to thereby have the thus-expanded shape. Thus solidified, therefore, the lens may have the desired shape. The degree of thermal shrinkage to be caused by cooling the glass material and the metal ring can be previously estimated. Accordingly, the lens thus fabricated may have the desired dimension by controlling the size of the cylindrical mold to be used.

In the prior-art fabrication method mentioned above, the pressing molds to press the glass material toward the cylindrical mold do not enter the opening of the metal ring in which the glass material forms a lens. When the glass material is pressed according to this method, all of the pressed glass material could not be completely housed inside the metal ring, and some glass material may be often forced out of the metal ring since the size of the metal ring and that of the glass pellet vary.

As a result, the outer peripheral shape of the lens could not be accurately formed, and even if the thus-fabricated lens is fitted to a fixture part, it could not be disposed in the predetermined site. This is one problem with the method. Another problem with the method is that the excess glass material having been forced out of the metal ring will be broken or cracked and will often damage the surface of the lens.

To solve the problem with the excess glass material forced out of the metal ring, a method may be taken into consideration of forming the lens surface by pressing at least one of the pressing molds into the inside of the metal ring.

In this method, however, the outer diameter of the pressing molds must be smaller than the inner diameter of the metal ring. Therefore, in this method, there will be a space, though narrow, between the pressure mold and the metal ring in the direction of the diameter of the metal ring.

As a result, the glass material being molded will be forced out through the narrow space by the pressing force of the mold and it will form thin flakes having been forced out of the narrow space. The thus forced-out thin flakes form impurities and will be broken to damage the normal face of the lens formed.

SUMMARY OF THE INVENTION

The present invention has been made in consideration of the matters as above, and its object is to provide a metal ring-fitted optical device having the advantages of good outer shape and high accuracy, and to provide a method for fabricating the metal ring-fitted optical device.

To solve the problems noted above, the present invention provides a method for fabricating a metal ring-fitted optical device, which comprises preparing a cylindrical mold that defines the shape of the outer peripheral side face to determine the position of the optical device to be fabricated in the mold, disposing inside it a metal ring of which the outer diameter is somewhat smaller than the inner diameter of the cylindrical mold and an optical material, and pressing a shaping mold against the optical material to thereby form a desired optical functional face of the optical device with the diameter of the metal ring being enlarged toward the wall of the cylindrical mold by the pressure applied to the optical material to thereby fabricate the intended optical device fitted in the metal ring that has a predetermined outer diameter, and which is characterized in that the metal ring to be disposed inside the cylindrical mold comprises a side cylindrical part of which the diameter is expanded toward the outer peripheral direction by the pressure applied thereto by the optical material disposed inside it thereby to be the final outer dimension of that part, and a curving cylindrical part which extends from the side cylindrical part toward one opening of the ring, a pressure is applied to the optical material to thereby expand the side cylindrical part of the ring, and the curving cylindrical part of the ring is folded toward the optical functional face of the optical device formed on the side of that one opening of the ring, by the shaping mold pressed against the optical material.

The invention also provides a metal ring-fitted optical device of which the outer face is covered with a metal ring and which has optical functional faces formed on both sides of the openings of the metal ring, and which is characterized in that the metal ring comprises a side cylindrical part of which the diameter is expanded toward the outer peripheral direction by the pressure applied thereto by the optical material disposed inside it thereby to be the final outer peripheral dimension of that part, and a curved cylindrical part which extends from the side cylindrical part toward one of the two openings of the ring, and is folded toward the optical functional face of the optical device formed on the side of that one opening of the ring while a pressure is applied to the optical material to be shaped.

In the metal ring-fitted optical device of the invention, the curved cylindrical part of the ring is folded by the shaping mold pressed against the optical material to be shaped.

The invention also provides a metal ring-fitted optical device with an optical functional face formed on its both surfaces, of which the outer side face is covered with a metal ring and the two optical functional faces each are adjacent to the brim of the metal ring that extends towards each optical functional face of the device.

According to the invention as above, the metal ring is expanded while the optical material is shaped into the optical device, and the curved cylindrical part of the optical device is folded toward the optical functional faces of the device. Accordingly, in the optical device of the invention, no optical material is forced out of the metal ring toward the outer peripheral direction of the ring, and the accuracy of the outer dimension of the optical device is increased. Moreover, since there is formed no space between the pressing mold and the metal ring in the direction of the diameter of the ring, no thin flakes are formed around the metal ring-fitted optical device fabricated in the invention, and the optical functions of the optical device are not worsened at all.

In the metal ring-fitted optical device of the invention in which the curved cylindrical part of the metal ring is folded by the shaping mold pressed against the optical material to be shaped into the optical device, the excess optical material is surely prevented from being forced out of the space between the metal ring and the pressing mold, and, as a result, both the accuracy of the outer dimension and the optical function of the metal ring-fitted optical device are improved.

In the metal ring-fitted optical device of the invention which has an optical functional face formed on its both surfaces and of which the outer side face is covered with a metal ring and the two optical functional faces each are adjacent to the brim of the metal ring that extends towards each optical functional face of the device, the optical material is not exposed out of the outer peripheral side face of the metal ring, and the optical functional faces of the optical device are surely prevented from being damaged and, in addition, both the optical functions and the accuracy of the outer dimension of the optical device are improved.

DESCRIPTION OF THE PREFERRED EMBODIMENTS

Figure 5:
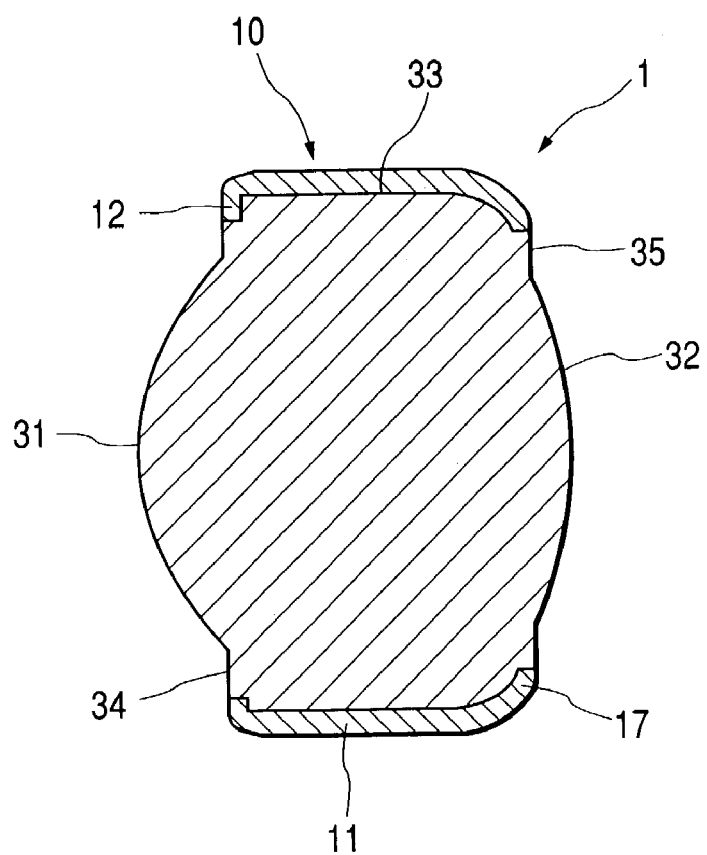
FIG. 5 is a cross-sectional view showing a metal ring-fitted aspherical glass lens of one embodiment of the invention.

The invention is described in detail with reference to the drawings attached hereto. In the embodiment illustrated herein, the optical device to be fabricated is a metal ring-fitted, aspherical glass lens 1 of FIG. 5. The metal ring-fitted, aspherical glass lens 1 has lens faces, namely convex faces 31, 32, and planar parts 34, 35 that surround the convex lens faces, and has an outer peripheral side face 33 to which a metal ring 10 is fitted.

Into the outer peripheral side face 33 of the metal ring-fitted, aspherical glass lens 1 of the invention of this embodiment, the metal ring 10 is fitted. The metal ring 10 is thin-walled and is made of a solderable and pressable metal, for example, an alloy of iron and nickel and its surface is plated in a predetermined manner.

Figure 3:
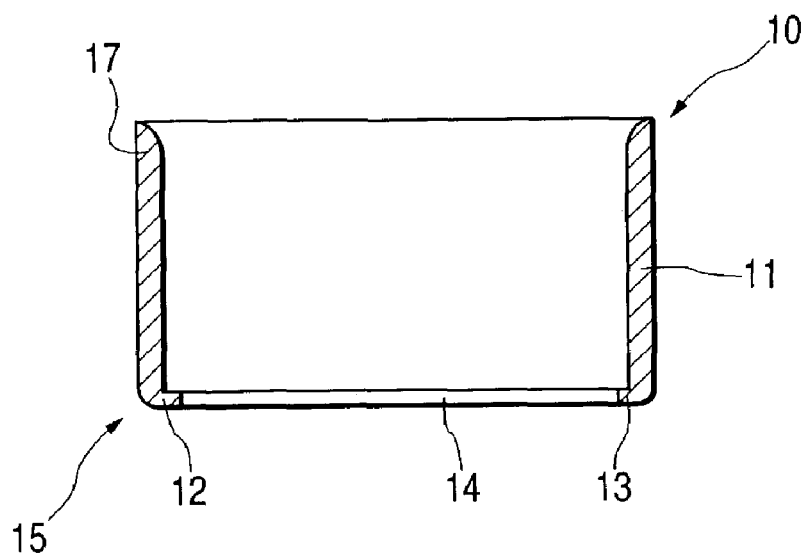
FIG. 3 shows the metal ring for an aspherical glass lens of one embodiment of the invention, illustrating a cross-sectional view cut along 3-3 line of FIG. 4.
Figure 4:
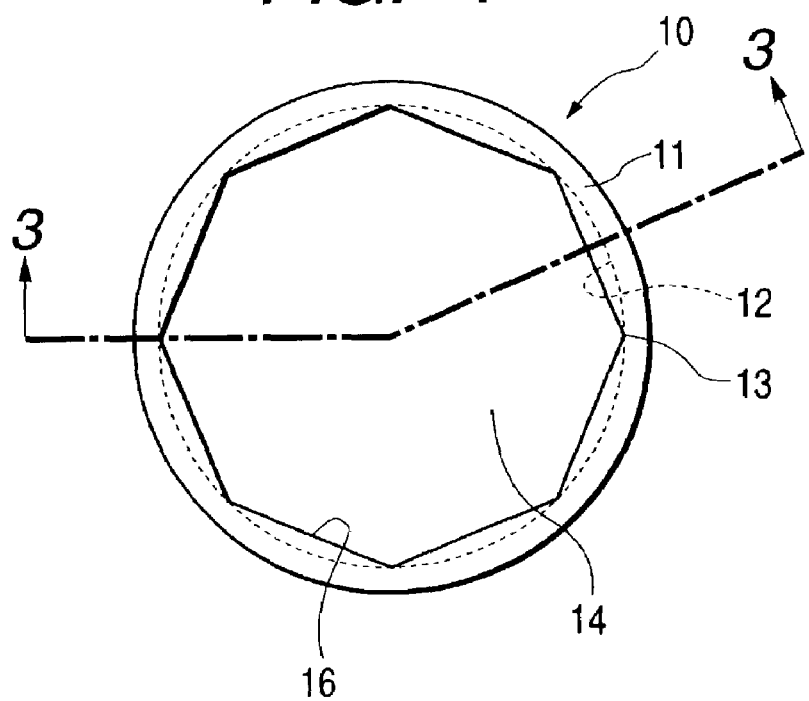
FIG. 4 is a bottom view showing the metal ring for an aspherical glass lens of one embodiment of the invention.

As in FIG. 3 and FIG. 4, the metal ring 10 is composed of a side cylindrical part 11 that receives inner pressure to expand towards its outer peripheral direction to have a final outer peripheral surface dimension, and a holding part 15 that is formed on the side of one opening of the side cylindrical part 11 and comprises a thin-walled, inner peripheral part 13 around the area extended from the inner peripheral face of the side cylindrical part 11, and a flange part 12 protruding outside toward the opening from the edge of the opening. In the upper part of the side cylindrical part 11 illustrated, formed is a curved cylindrical part 17 of which the diameter is the same as that of the side cylindrical part 11.

In the holding part 15 of this embodiment, formed is an opening 14 with an octagonal edge 16 that is inscribed in the inner peripheral edge of the side cylindrical part 11. In this embodiment, around the top of the opening 14 forms the thin-walled part 13; and the part between the octagonal edge 16 of the opening 14 and the side cylindrical part 11 forms the flange 12.

Figure 1:
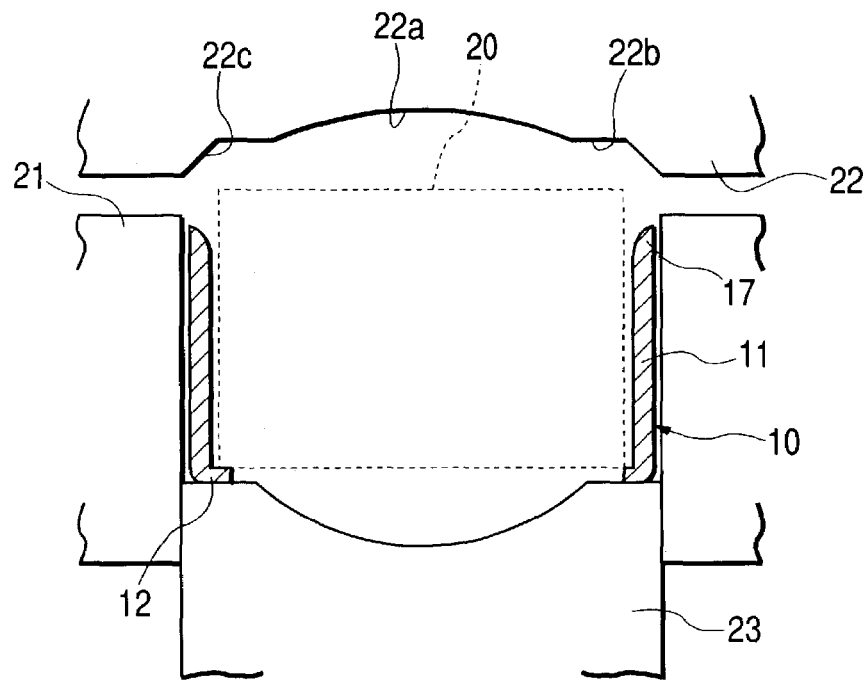
FIG. 1 shows a process of fabricating a metal ring-fitted aspherical glass lens of one embodiment of the invention, illustrating a cross-sectional view of the mold unit to form the lens, in which the mold unit is not closed to press the lens material.
Figure 2:
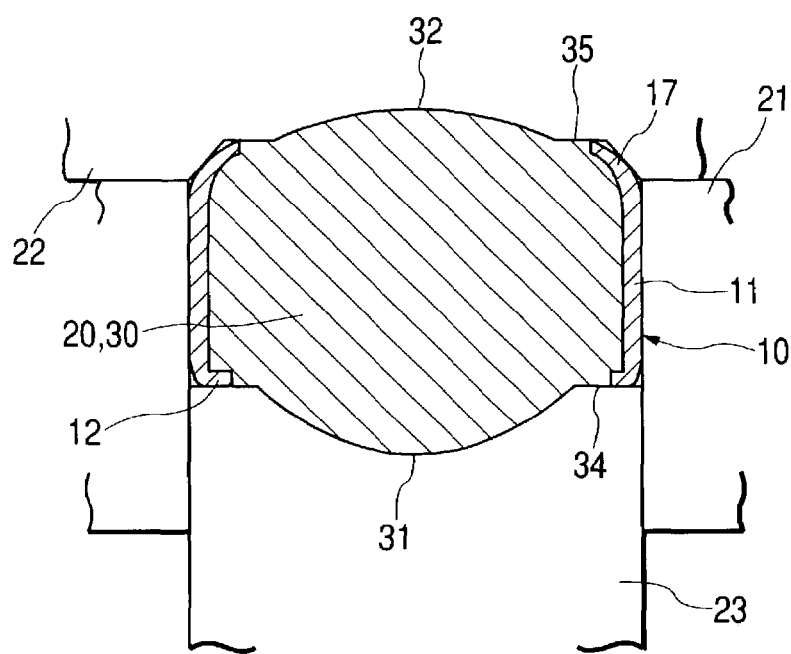
FIG. 2 shows a process of fabricating a metal ring-fitted aspherical glass lens of one embodiment of the invention, illustrating a cross-sectional view of the mold unit to form the lens, in which the mold unit has been closed to press the lens material.

In this embodiment, used is a molding unit partially shown in FIG. 1 and FIG. 2. The molding unit comprises a cylinder mold 21, an upper mold 22 and a lower mold 23. The lower mold 23 is to form one convex face 31 of the metal ring-fixed, aspherical glass lens 1, and this is fixed on a stand (not shown). Opposite to this lower mold 23, disposed is the upper mold 22 that is to form the other convex face 32 of the lens 1. The upper mold 22 is movable relative to the fixed lower mold 23, and it moves toward and from the fixed lower mold 23. The cylinder mold 21 is put between the upper mold 22 and the lower mold 23. The cylinder mold 21 is movable relative to the lower mold 23, but in general, it is in the position as in FIG. 1. In that condition, the upper mold 22 moves toward the lower mold 23, and after the upper mold 22 has been contacted with the cylinder mold 21, both the upper mold 22 and the cylinder mold 21 are integrated together and move downward to be as in FIG. 2.

The upper mold 22 is designed to have a concave face 22a that is to form the convex face 32 of the metal ring-fitted, aspherical glass lens 1, a peripheral area 22b that surrounds the part 22a, and a pressing part 22c that presses the curving cylindrical part 17 of the metal ring 10 so as to fold the curving cylindrica part 17.

A method for fabricating the metal ring-fitted, aspherical glass lens 1 of this embodiment is described below. In this embodiment of fabricating the metal ring-fitted, aspherical glass lens 1, an optical glass pellet 20 is put into the cavity of the cylinder mold 21, and is pressed by the upper mold 22 and the lower mold 23 in the upward and downward directions to thereby form the intended optical functional faces of the lens 1. In this process, the inner diameter of the cylinder mold 21 shall be determined in consideration of the outer diameter of the metal ring-fitted, aspherical glass lens 1 to be fabricated herein and of the dimensional shrinkage of the optical glass cooled in the process.

In this embodiment, a metal ring 10 is first set in the cylinder mold 21 in such a manner that its flange 12 is on the lower mold 23 as shown in FIG. 1. The metal ring 10 has the structure mentioned hereinabove, and its outer diameter is slightly smaller than the inner diameter of the cylinder mold 21. The metal ring 10 is thin-walled (for example, having a wall thickness of 0.05 mm), and its outer diameter is expanded up to the inner diameter of the cylinder mold 21 owing to its inner pressure.

Next, an optical glass pellet 20 is put inside the metal ring 10, in which it is shaped into a lens. The pellet 20 is cylindrical, and when disposed inside the metal ring 10, it is on the flange 12 of the holding part 15 of the metal ring 10, and is therefore not in direct contact with the lower mold 23 as shown in FIG. 1. Accordingly, heating the optical glass pellet 20 has little influence on the lower 23.

The optical glass pellet 20 may be any ordinary glass pellet for optical lenses, but shall have predetermined optical properties. The volume of the pellet 20 shall be the same as the volume of the end product, lens 30.

Next, while the metal ring 10 and the optical glass pellet 20 are disposed inside the cylinder mold 21, an alternating current is made to run through a heating coil (not shown) disposed around the cylinder mold 21, whereby the cylinder mold 21 is heated by the induced electromotive force of the heating coil. The cylinder mold 21 is thus heated, and the pellet 20 inside the metal ring 10 disposed in the cylinder mold 21 is thereby heated and softened, and in this condition, the upper mold 22 and the lower mold 23 are brought near to each other, as in FIG. 2. The upper and lower faces of the pellet 20 inside the metal ring 10 sandwiched between the two molds form predetermined optical faces 31 and 32, respectively. Thus processed, the pellet 20 forms a lens 30.

In this step, the pressure of the softening pellet 20 expands the metal ring 10 toward the outer peripheral direction, and the thus-expanded metal ring 10 shall therefore have the final outer dimension. In this stage, the side cylindrical part 11 of the metal ring 10 readily expands to have the same inner diameter as that of the cylinder mold 21. On the other hand, the holding part 15 formed around one opening of the side cylindrical part 11 of the metal ring 10 is hardly deformed by the inner pressure at the part having the flange 12 formed therein, but the thin-walled part 13 of the holding part 15 is readily deformed. Accordingly, the holding part 15 is readily deformed as a whole, and the metal ring 11 is therefore deformed to have a desired outer shape having a desired dimension.

Thus processed, the metal ring 10 firmly bonds to be integrated with the lens 30, and the outer diameter dimension of the metal ring 10 shall be a predetermined size after the lens 30 has been solidified therein.

In the step where the upper mold 22 is brought near to the lower mold 23, the upper mold 22 is kept in contact with the pellet 20 to press it, and during this, the pressing part 22c of the upper mold 22 is brought into contact with the top of the curving cylindrical part 17 of the metal ring 10. With the upper mold 22 further descending down, the curving cylindrical part 17 is folded by the inclined face of the pressing part 22c toward the center of the pellet 20, or that is, toward the convex face 32 of the lens 30.

After the pellet to be the lens is further pressed as in FIG. 2, a planar part 35 is formed around the convex face 32 of the thus-pressed lens, and the curved cylindrical part 17 of the metal ring 10 is then folded to be adjacent to the planar part 35, and it is on the same level as that of the neighboring planar part 35.

The lower convex face 31 of the lens 30 is also so designed that the planar part 34 and the flange 12 are on the same level around it, as in FIG. 2. In the illustrated case, the flange 12 shall surround the convex face 31 at the opening 14 of the metal ring 10.

As in the above, the curving cylindrical part 17 is folded to surround the convex face 32 of the lens being molded, and therefore the optical material of glass is not forced out of the metal ring 10 in the process of this embodiment.

In particular, the upper mold 22 used herein to form the convex face 32 of the metal ring-fitted, aspherical glass lens 1 is so specifically designed that it folds the curving cylindrical part 17 of the metal ring 10. Using it, therefore, the glass material to form the lens is surely prevented from being forced out of the ring.

In addition, when both the convex face 31 and the convex face 32 are so designed as to have the flange 12 that serves as a brim and the curved cylindrical part 17 around them, no glass is exposed out of the outer peripheral side face of the metal ring 10. Accordingly, this structure surely prevents damage to the optical functional faces of the metal ring-fitted optical device of the invention.

Figure 6:
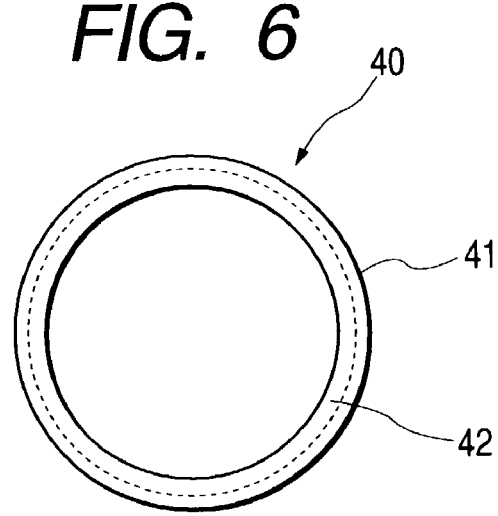
FIG. 6 is a bottom view showing the metal ring for an aspherical glass lens of another embodiment of the invention.
Figure 7:
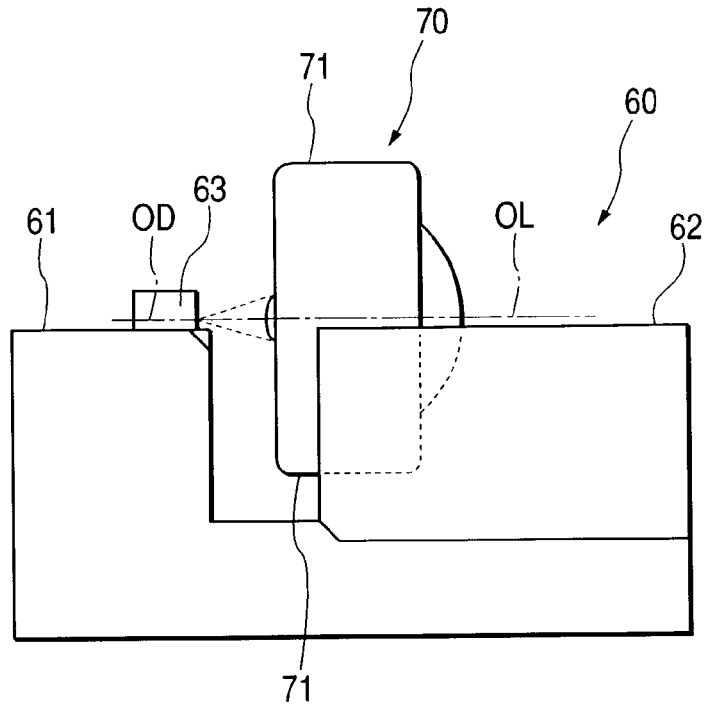
FIG. 7 is a front view showing a conventional aspherical glass lens fitted to a fixture member.
Figure 8:
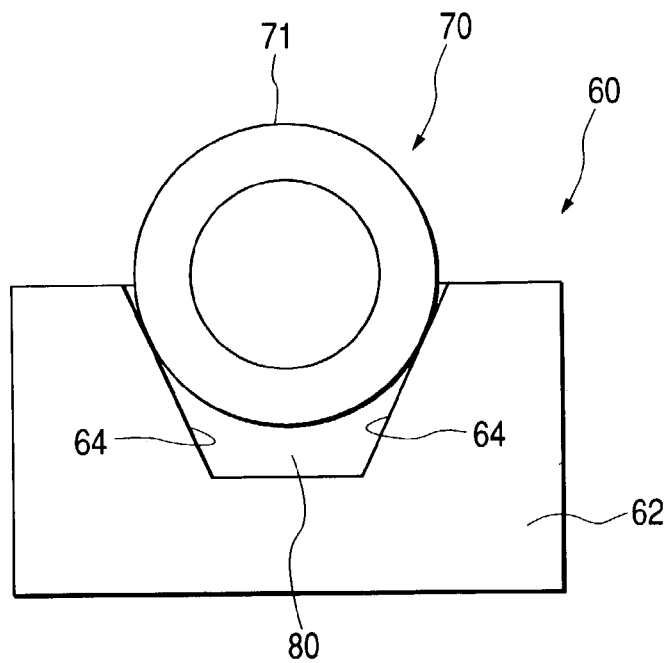
FIG. 8 is a side view showing the conventional aspherical glass lens fitted to a fixture member.

Regarding the shape of the brim to be formed around the convex face 31, a circular flange 42 may be formed around the entire inner periphery of the side cylindrical part 41 of the metal ring 40 as in FIG. 6, in place of the polygonal flange 12 as hereinabove. The circular flange 42 formed around the entire inner periphery of the side cylindrical part as illustrated is more effective for more surely preventing excess glass protrusion out of the metal ring, than the flange 12 mentioned hereinabove.

In this embodiment illustrated, the curving cylindrical part 17 is put upside in the cylinder mold 21 where the lens is molded. Contrary to this, the curving cylindrical part 17 may be put downside in the cylinder mold 21.

According to this embodiment described hereinabove, a small-sized, metal ring-fitted, aspherical glass lens that can be fitted to a fixture member by soldering can be fabricated in a simplified manner. Thus fabricated, the ring-fitted lens has a good outer shape and its accuracy is high.

In the embodiment described above, a lens is formed as one example of the optical device, but it is not limitative. Apart from it, the optical device of the invention includes any others such as prisms, diffraction gratings, thin-film monolithic optical devices, etc.

As described in detail hereinabove with reference to its some preferred embodiments, the present invention produces the following advantages. According to the invention, the metal ring is expanded while the optical material is shaped into the optical device, and the curved cylindrical part of the optical device is folded toward the optical functional faces of the device. Accordingly, in the optical device of the invention, no optical material is forced out of the metal ring toward the outer peripheral direction of the ring, and the accuracy of the outer dimension of the optical device is increased. Moreover, since there is formed no space between the pressing mold and the metal ring in the direction of the diameter of the ring, no thin flakes are formed around the metal ring-fitted optical device fabricated in the invention, and the optical functions of the optical device are not worsened at all.

In the metal ring-fitted optical device of the invention in which the curved cylindrical part of the metal ring is folded by the shaping mold pressed against the optical material to be shaped into the optical device, the excess optical material is readily prevented from being forced out of the space between the metal ring and the pressing mold, and, as a result, both the accuracy of the outer dimension and the optical function of the metal ring-fitted optical device are improved.

In the metal ring-fitted optical device of the invention which has an optical functional face formed on its both surfaces and of which the outer side face is covered with a metal ring and the two optical functional faces each are adjacent to the brim of the metal ring that extends towards each optical functional face of the device, the optical material is not exposed out of the outer peripheral side face of the metal ring, and the optical functional faces of the optical device are surely prevented from being damaged and, in addition, both the optical functions and the accuracy of the outer dimension of the optical device are improved.

What is claimed is:

1. A metal ring-fitted optical device comprising an outer face that is covered with a thin-walled metal ring and optical functional faces formed on both sides of openings of the metal ring; wherein the thin-walled metal ring comprises, inside a cylindrical mold that defines a shape of an outer peripheral side surface, a side cylindrical part of which a diameter is expanded toward the cylindrical mold by pressure applied thereto by optical material disposed inside the side cylindrical part, thereby obtaining a final outer peripheral dimension of the side cylindrical part, a flange provided around one of the openings of the side cylindrical part and extending inward from the side cylindrical part; and a curved cylindrical part which extends from the side cylindrical part toward the other of the openings of the ring, and is folded toward the optical functional face of the optical device formed on a side of the other opening of the ring while pressure is applied to the optical material to be shaped, wherein the optical material intimately contacts the entire inner surface of the side cylindrical part, flange, and the curved cylindrical part.

2. The metal ring-fitted optical device as claimed in claim 1, wherein the curved cylindrical part of the ring is folded by a shaping mold pressed against the optical material to be shaped.

3. The metal ring-fitted optical device as claimed in claim 1, wherein the flange is circular.

4. The metal ring-fitted optical device as claimed in claim 1, wherein the flange is polygonal.

5. The metal ring-fitted optical device as claimed in claim 1, wherein the entire inner side of the side cylindrical part contacts the optical material.

6. The metal ring-fitted optical device as claimed in claim 1, wherein the optical material fills the metal ring.

* * * * *